US007047107B2

(12) United States Patent
Kimura et al.

(10) Patent No.: US 7,047,107 B2

(45) Date of Patent: May 16, 2006

(54) ROBOT CONTROL APPARATUS

(75) Inventors: Katsumi Kimura, deceased, late of Tokyo (JP); Sachiyo Minoshima, legal representative, Gifu (JP); Minoru Kimura, legal representative, Inazawa (JP); Hisako Kimura, legal representative, Inazawa (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 469 days.

(21) Appl. No.: 10/258,171

(22) PCT Filed: Feb. 22, 2001

(86) PCT No.: PCT/JP01/01304

§ 371 (c)(1), (2), (4) Date: Oct. 22, 2002

(87) PCT Pub. No.: WO02/066210

PCT Pub. Date: Aug. 29, 2002

(65) Prior Publication Data

US 2004/0054437 A1 Mar. 18, 2004

(51) Int. Cl.
*G06F 19/00* (2006.01)

(52) U.S. Cl. ...................... 700/245; 700/246; 700/247; 700/257; 318/560; 318/567; 318/568.1; 318/568.11; 318/568.12; 318/568.13; 318/568.2; 901/1; 701/26; 701/213

(58) Field of Classification Search ................ 700/245, 700/246, 247, 257; 318/567, 560, 568.1, 318/568.11, 568.12, 568.13, 568.2; 901/1; 701/26, 213

See application file for complete search history.

(56) References Cited

U.S. PATENT DOCUMENTS 5,838,562 A * 11/1998 Gudat et al. ................ 701/213
5,956,250 A * 9/1999 Gudat et al. .................. 701/26
6,092,004 A 7/2000 Harima
6,356,806 B1 * 3/2002 Grob et al. ................. 700/245
6,472,838 B1 * 10/2002 Shikazono et al. ......... 318/567

FOREIGN PATENT DOCUMENTS

JP 62232006 A * 10/1987
JP 09034528 A * 2/1997
JP DWPI 1998-067622 * 11/1997
JP 11-104981 A 4/1999
TW 369463 9/1999
TW 090105377 8/2001

* cited by examiner

*Primary Examiner*—Thomas G. Black
*Assistant Examiner*—McDieunel Marc
(74) *Attorney, Agent, or Firm*—Sughrue Mion, PLLC

(57) ABSTRACT

There are provided a parameter storage part for storing monitor point information, a locus generation part for generating motions of the support, each joint point, and the like based on the movement command, a control point speed control part for obtaining speed of the control point such as the support, each joint point, and the like, a monitor point speed control part for obtaining speed of the monitor point generated from motion speed of the control point, and a motion command part for selecting the maximum speed among the speed of the control point and the speed of the monitor point to compare the maximum speed with the command speed and changing and controlling the speed of the control point to the command speed when the maximum speed exceeds the command speed.

7 Claims, 9 Drawing Sheets

ROBOT CONTROL APPARATUS

TECHNICAL FIELD

This invention relates to a control apparatus for controlling a motion of a robot having two or more driving parts at a command speed or lower.

BACKGROUND ART

In a robot control apparatus according to the related art, control in which using a position of a hand etc. of the top of a robot as a control point, its speed does not exceed a command speed or control in which a speed of a joint part at a time when passing through a singular point does not exceed a limit speed of a driving apparatus has been performed.

FIG. 6 is a diagram showing an appearance configuration of a horizontal joint type robot used in the related art and comprising a robot 1, a control apparatus 2, and a manual operation apparatus 3 for operating the robot. The robot 1 comprises a hand 11 for grasping an article, a second arm 12, a first arm 13, a support 14, and a base 15.

FIG. 7 is a block diagram showing each internal configuration of the control apparatus 2 for robot and the manual operation apparatus 3 described in JP-A-11-104981. But, in order to make a configuration of a robot apparatus clear, an appearance of the robot 1 is appended to the diagram. The control apparatus 2 comprises a parameter storage part 21, a locus generation part 22, a speed control part 23, a motion command part 24, and a driving control part 25. Also, the manual operation apparatus 3 comprises a key input part 31 and a key information output part 32.

A key operation by an operator is inputted to the key input part 31 of the manual operation apparatus 3 and the information is outputted to the key information output part 32. As a result of this, manual motion information ΔP outputted is inputted to the locus generation part 22 of the control apparatus 2. Here, in accordance with the manual motion information ΔP, a command speed $V_S$ stored in the parameter storage part 21 is selected and based on this command speed $V_S$, the movement amount ΔL per unit time ΔT, which is a calculation cycle of the control apparatus 2, is calculated.

$$\Delta L = V_S \times \Delta T$$

Motion locus generation is performed based on the movement amount ΔL calculated here.

$$P_2 = P_1 + \Delta L$$

where $P_1$ indicates the present position of the robot 1 and $P_2$ indicates a motion target position of the robot 1. The motion target position $P_2$ of the robot 1 generated here is outputted to the speed control part 23 as a motion command. In the speed control part 23, speed monitor control is performed based on the motion target position $P_2$. Here, the actual speed $V_j$ is calculated by using the present position $P_1$ of the robot 1 and the motion target position $P_2$.

$$V_j = |P_2 - P_1| / \Delta T$$

With the calculated speed $V_j$, a speed ratio $V_{ratio}$ is calculated from the command speed $V_S$ stored in the parameter storage part 21.

$$V_{ratio} = V_S / V_j$$

Here, a case of $V_{ratio}>1$ indicates that a speed can be increased still and a case of $V_{ratio}<1$ indicates that the present speed needs to be decreased.

By using the ratio of $V_{ratio}$ calculated here, the motion target position $P_2$ is again created in the motion command part 24.

$$P_2 = P_1 + \Delta L \times V_{ratio}$$

The motion target position $P_2$ calculated here is outputted to the driving control part 25 as a motion command. By performing speed monitoring in this speed control part 23 and regeneration of the motion target position in the motion command part 24 every calculation cycle of the control apparatus 2, motions are made at a speed lower than or equal to a reference speed.

As described above, in the robot control apparatus according to the related art, a movement speed is controlled so that the hand 11 of the robot top or a joint part is used as a control point and its speed does not exceed a safe speed. Also, even during a teaching mode of the robot, since a teacher works in very close contact with the robot, it is disclosed that the movement speed is controlled so that the speed of the hand 11 or the joint part which is the control point does not exceed the safe speed in order to ensure the safety.

However, the robot generally comprises plural joints, and depending on an attitude, the hand 11 mounted in the arm top or the joint part may not move at the highest speed. These examples will be described using motion illustrations of the robot of FIGS. 8 to 10.

First, in a horizontal joint type robot shown in a motion illustration of FIG. 8, when a position of a hand 11 is moved from a point A to a point B, a point C which is a joint part between the first arm 13 and the second arm 12 moves to a point D about a turn center point O of a support 14. Also, a point E which is the top of the first arm 13 moves to a point F and as is evident from the drawing, it is found that a line segment EF of the movement amount of the top of the first arm 13 is longer and a movement speed thereof is larger as compared with a line segment AB of the position movement amount of the hand 11. Generally, in the case that the point A which is a position of the hand 11 is located within a radius of a length $L_o$ of the first arm 13 when viewed from the turn center point O of the support 14, an elbow part which is a joint part between the first arm 13 and the second arm 12, namely the point C or point E moves at a speed larger than a movement speed of the hand 11.

Further, in a horizontal joint type robot shown in a motion illustration of FIG. 9, similarly when a point A of a position of a hand 11 is moved from a state in which a first arm 13 and a second arm 12 extend in a straight line to a point B toward a turn center point O of a support 14, a point C of a joint part between the first arm 13 and the second arm 12 and a point E of the top of the first arm 13 move at a speed higher than that of the point A of the position of the hand 11.

Furthermore, in a vertical multi-joint type robot shown in FIG. 10, as the same marks as the horizontal joint type robot shown in FIG. 8 are allotted, a point C of a joint part moves at a speed higher than that of a point A of a position of a hand 11 and further one point E of a second arm 12 moves at a high speed.

DISCLOSURE OF THE INVENTION

This invention is constructed so that a portion, other than a control point of a robot, in which a motion speed may become large, in other words, the arm end most distant from a joint part is set as a monitor point and a distance from the joint part to the monitor point and an angle is stored in a parameter storage part as monitor point information and a movement speed of the monitor point is calculated based on a rotational speed of the joint part obtained from a movement command of the control point of the robot and a target motion position is changed so that all the movement speed of each control point and the movement speed of each monitor point become a command speed or lower and as a result of that, the motion speed is changed and controlled.

It is constructed so that a distance from the joint part to both ends of an arm or an angle is stored in the parameter storage part as the monitor point information.

It is constructed so that a distance from the joint part to a transferred article or an angle and a distance to the arm end or an angle are stored in the parameter storage part as the monitor point information.

It is constructed so that a movement speed of each monitor point is calculated based on a rotational speed of each joint part and an attitude of each arm, etc. obtained from a movement command of the control point of the robot and further a combined movement speed is calculated from a coupling state of the arms and the movement speed of each monitor point and a target motion position is changed so that all the movement speed of each control point, the movement speed of each monitor point and the combined movement speed of each monitor point become a command speed or lower and as a result of that, the motion speed is changed and controlled.

In a case of using a robot control apparatus of this invention, the control point of the robot and the monitor point of the robot do not move at a speed higher than the command speed when viewed from a base of the robot, so that there is an effect that a trial run for setting the command speed, etc. becomes unnecessary.

Also, in a case that a teaching operator performs teaching operations in the vicinity of the robot, since an arm etc. do not move suddenly at a speed higher than the command speed, safety of the teaching operator can be ensured and further there is no need to set a teaching speed at low speed making allowance for safety to perform the teaching operations, so that there is an effect that the teaching operations can be performed efficiently.

Also, in a case that the robot control apparatus of this invention is adopted to a wrist shaft provided in the top of the robot and a monitor point is specified to the top of a transferred article, even though a rotational speed command of the wrist shaft is set at high speed, the top of the transferred article does not move at a specified speed higher than a motion command speed of the robot, so that there is an effect that setting of a rotational speed is also simplified.

BEST MODE FOR CARRYING OUT THE INVENTION

First Embodiment

A first embodiment of this invention will be described with reference to FIGS. 1 to 3.

Figure 1:
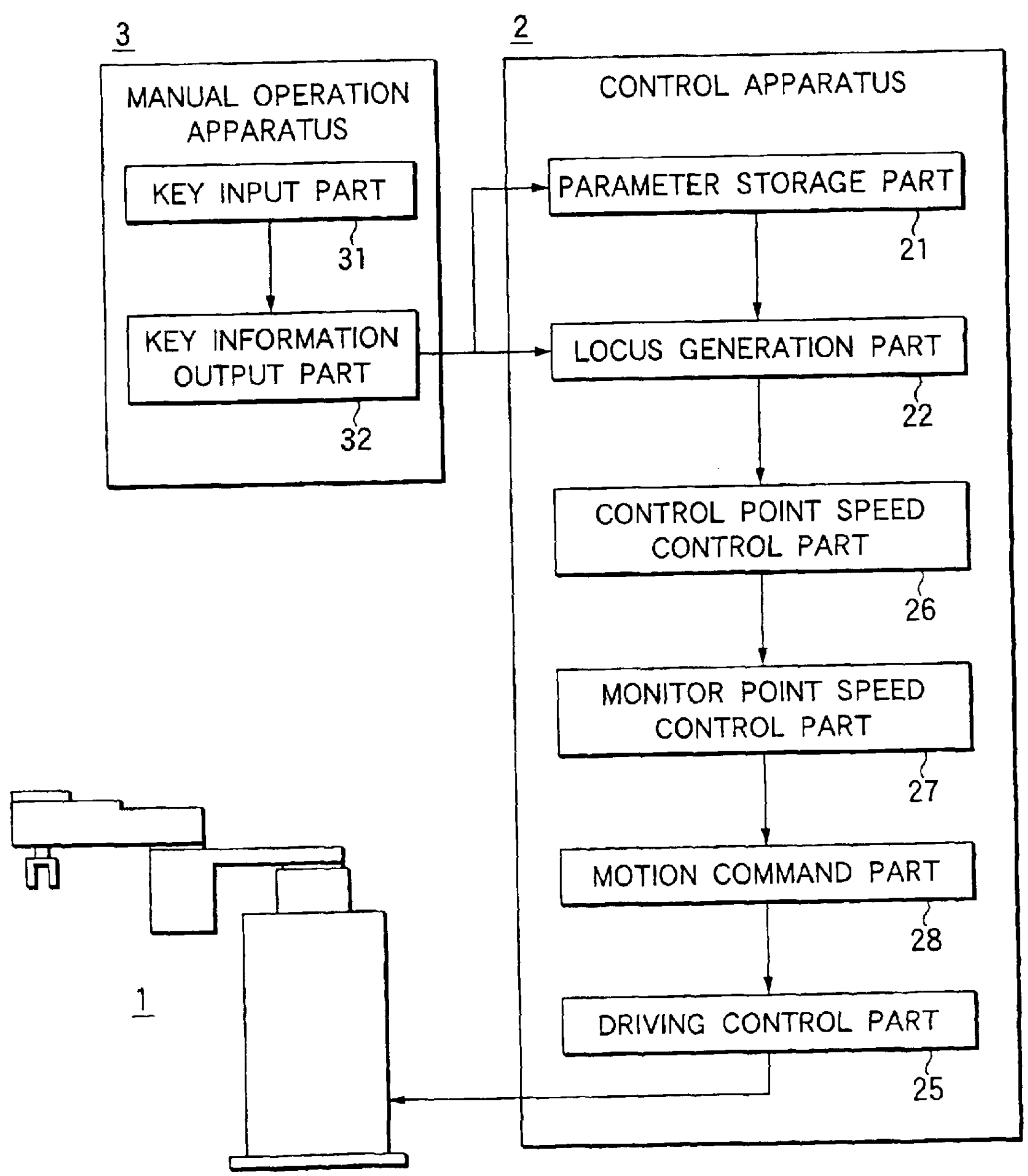
FIG. 1 is a block diagram of a robot control apparatus according to a first embodiment of this invention.
Figure 2:
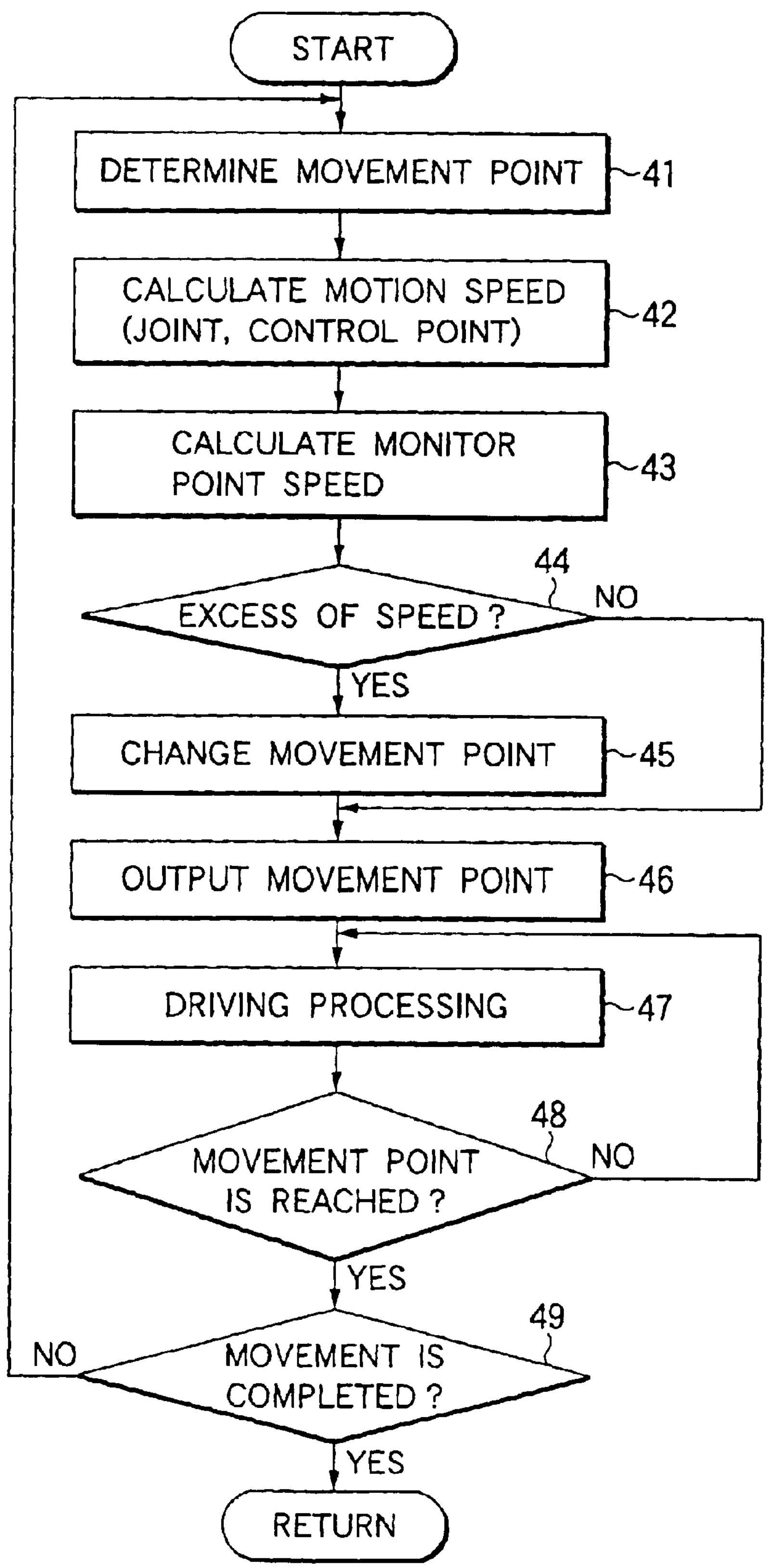
FIG. 2 is a flowchart illustrating processing operations according to the first embodiment.
Figure 3:
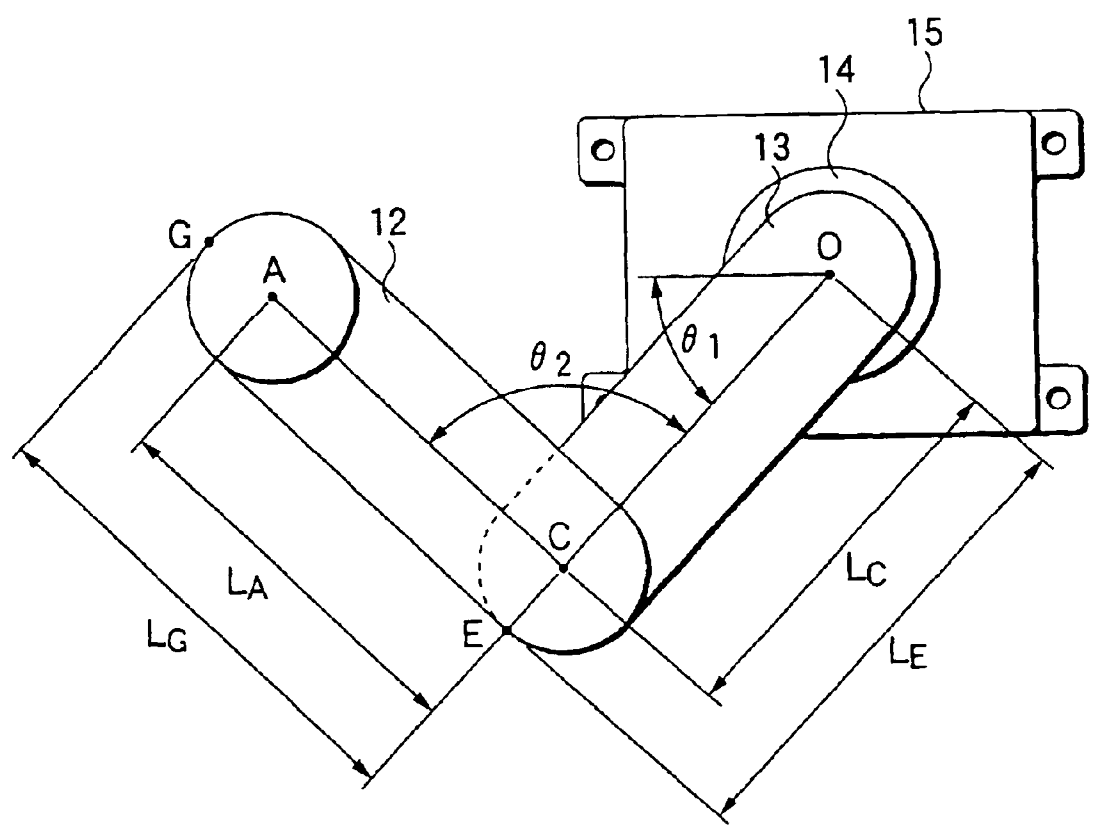
FIG. 3 is a motion illustration illustrating a motion of a robot according to the first embodiment.
Figure 7:
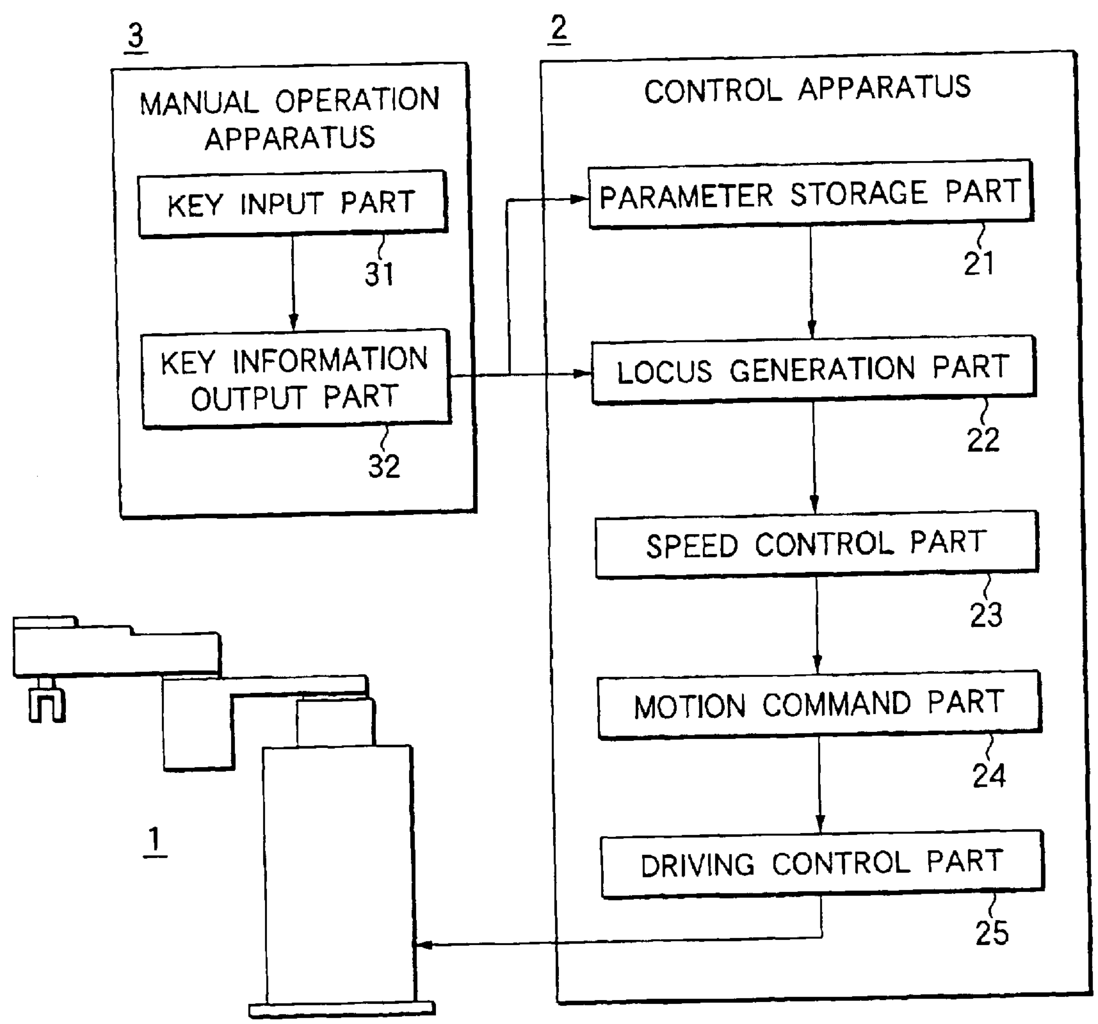
FIG. 7 is a block diagram of a robot control apparatus according to the related art.
Figure 8:
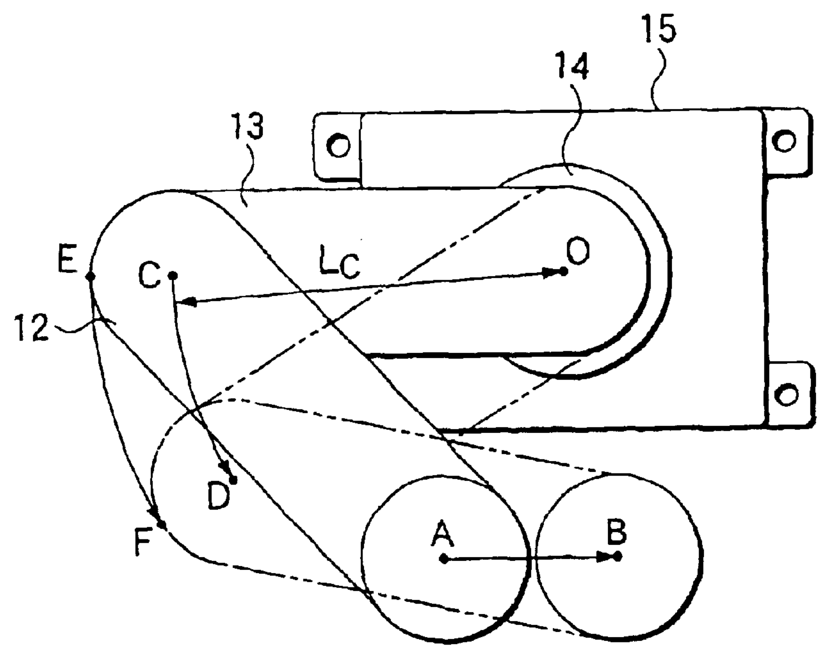
FIG. 8 is a motion illustration illustrating a motion of a horizontal multi-joint type robot according to the related art.
Figure 9:
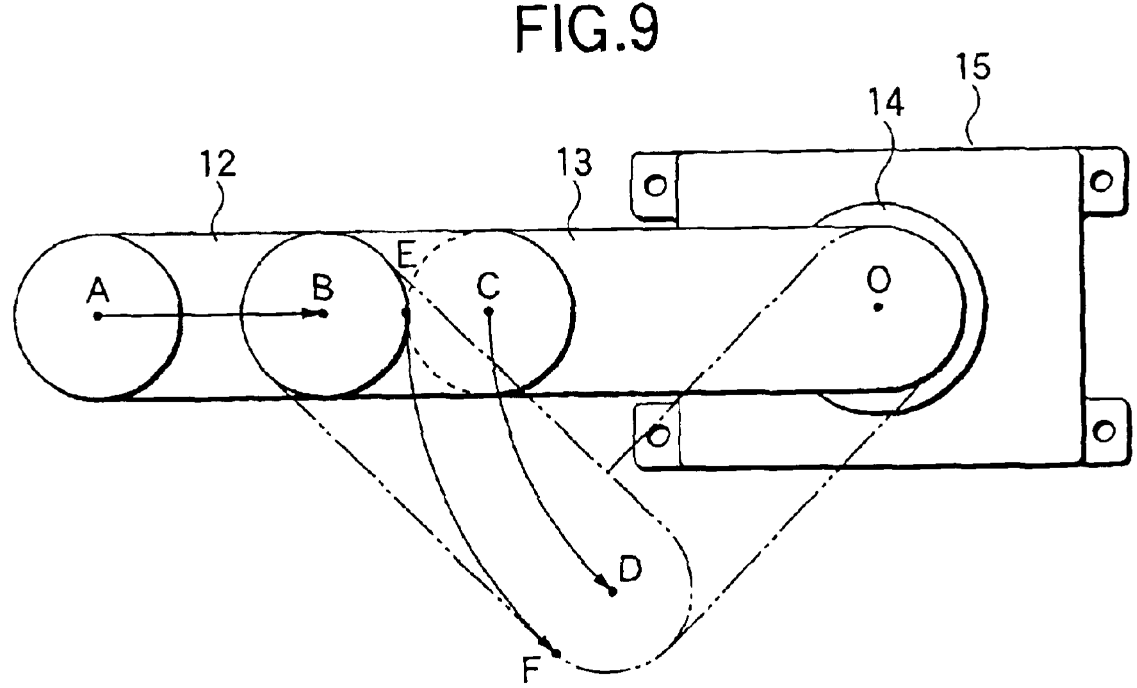
FIG. 9 is a motion illustration illustrating a motion of a horizontal multi-joint type robot according to the related art.

FIG. 1 is a block diagram showing the first embodiment, and FIG. 2 is its flowchart. FIG. 3 is a motion illustration of a robot. Incidentally, an appearance configuration of an apparatus is similar to the apparatus according to the related art shown in FIG. 7, and comprises a robot 1, a control apparatus 2, and a manual operation apparatus 3. A point different from the apparatus according to the related art is a configuration of the control apparatus 2 and its detail will be described with reference to the drawings.

In FIG. 1, numeral 21 is a parameter storage part which stores various parameter values and motion programs necessary for driving control of the robot 1. In this invention, as monitor point information, distances $L_A$, $L_C$, etc. from a joint part of each arm to the top of the arm are stored in the parameter storage part 21 as parameters. Numeral 22 is a locus generation part which determines the movement amount $\Delta L$ from a command speed $V_S$ stored in the parameter storage part and time $\Delta T$ which is a calculation cycle of a CPU (not shown) of the control apparatus 2 when a movement command is issued from the manual operation apparatus 3 or a movement command is issued from the robot motion programs, and repeats movement locus generation from the present position $P_1$ to a target position $P_2$ after the time $\Delta T$ and performs locus generation to the final movement command position. Numeral 26 is a control point speed control part which calculates a motion speed in a hand 11 and each joint part as a motion speed of a control point. Numeral 27 is a monitor point speed control part which obtains a movement speed at a monitor point from the motion speed of the control point obtained by the control point speed control part 26 and the monitor point information stored in the parameter storage part 21. Numeral 28 is a motion command part which compares a movement speed at a control point and a movement speed at a monitor point with a command speed stored in the parameter storage part 21 and changes a motion speed of a joint so that the control point or the monitor point becomes the command speed when the movement speed at the control point or the monitor point exceeds the command speed. Numeral 25 is a driving control part which performs servo control of a driving motor (not shown) based on a command from the motion command part 28 and performs rotation control of a support 14 of the side of the robot 1 and a joint part of each arm.

Next, motions will be described based on a flowchart of FIG. 2.

When activation of the motion programs stored in the parameter storage part 21 or the movement command from the manual operation apparatus 3 is generated, in step 41, the locus generation part 22 calculates the movement amount $\Delta L$ every calculation cycle $\Delta T$ of the control apparatus 2 from the command speed $V_S$ stored in the parameter storage part 21 toward a terminal point position of the movement command.

$$\Delta L = V_S \times \Delta T$$

The locus generation part 22 performs motion locus generation based on the movement amount ΔL calculated here.

$$P_2=P_1+\Delta L$$

Incidentally, $P_1$ indicates the present position of the robot 1 and $P_2$ indicates a motion target position of the robot 1 after a lapse of the time ΔT. The motion target position $P_2$ of the robot 1 generated by the locus generation part 22 is outputted to the control point speed control part 26 as a motion command.

In step 42, the control point speed control part 26 obtains a rotational angle $\Delta\theta_1$ of a first arm 13 per unit time ΔT, a rotational angle $\Delta\theta_2$ of a second arm 12 per unit time ΔT, etc. based on the motion target position $P_2$. Further, a movement speed at each control point such as a joint part is obtained from the obtained rotational angle. For example, a movement speed $V_C$ of a point C which is a joint part of the first arm 13 can be obtained from a length $L_C$ and the rotational angle $\Delta\theta_1$ of the first arm 13 by the following expression.

$$V_C=L_C\times\Delta\theta_1/\Delta T$$

Similarly, a speed $V_A$ of a point A which is a position of a hand 11 can also be obtained from a rotational angle $\Delta\theta_1$of the support 14, a rotational angle $\Delta\theta_2$ of the second arm 12, lengths $L_C$, $L_A$ of each arm, attitudes $\theta_1$, $\theta_2$ of each arm and so on.

Next, in step 43, the monitor point speed control part 27 obtains a movement speed at each monitor point from the movement speed of each control point obtained in the control point speed control part 26 and information on each monitor point stored in the parameter storage part 21. For example, a movement speed of a monitor point E of the first arm 13 can be obtained from a distance $L_E$ from a rotation center point O of the support 14 to the point E and the rotational angle $\Delta\theta_1$ of the support 14 by the following expression.

$$V_E=L_E\times\Delta\theta_1/\Delta T$$

Similarly, a movement speed of a monitor point G of the second arm 12 can be obtained by combining a movement speed of the point C by rotation of the first arm 13 and a movement speed of the point G by rotation of the second arm 12 about the point C with respect to the first arm 13.

In step 44, the motion command part 28 compares a speed of the control point and a speed of the monitor point obtained in the control point speed control part 26 and the monitor point speed control part 27 with a command speed $V_S$. When there is the speed exceeding the command speed $V_S$, the maximum speed is selected and the process proceeds to step 45 and when all are lower than or equal to the command speed $V_S$, the process proceeds to step 46. Incidentally, here, description is made assuming that the movement speed $V_E$ of the monitor point E in FIG. 3 is the largest and is larger than the command speed $V_S$.

In step 45, the motion command part 28 obtains a speed ratio $V_{ratio}$ in a manner similar to the method according to the related art by the following expression.

$$V_{ratio}=V_S/V_E$$

By using the ratio of $V_{ratio}$ calculated here, the motion target position $P_2$ is again created based on the following expression.

$$P_2=P_1+\Delta L\times V_{ratio}$$

In step 46, the motion command part 28 outputs the calculated motion target position $P_2$ to the driving control part 25 as a motion command.

In steps 47 and 48, the driving control part 25 outputs a driving command of a driving motor of the robot 1 until reaching the target position $P_2$.

In step 49, a CPU of the control apparatus 2 decides whether movement is performed to the terminal point position of the movement command or not, and if it is decided that the movement is not completed, the process returns to step 41 and setting of the next target position $P_2$ is made. Also, if it is decided that the movement is completed, this processing is ended and a wait is performed until next movement command is issued.

Second Embodiment

Figure 4:
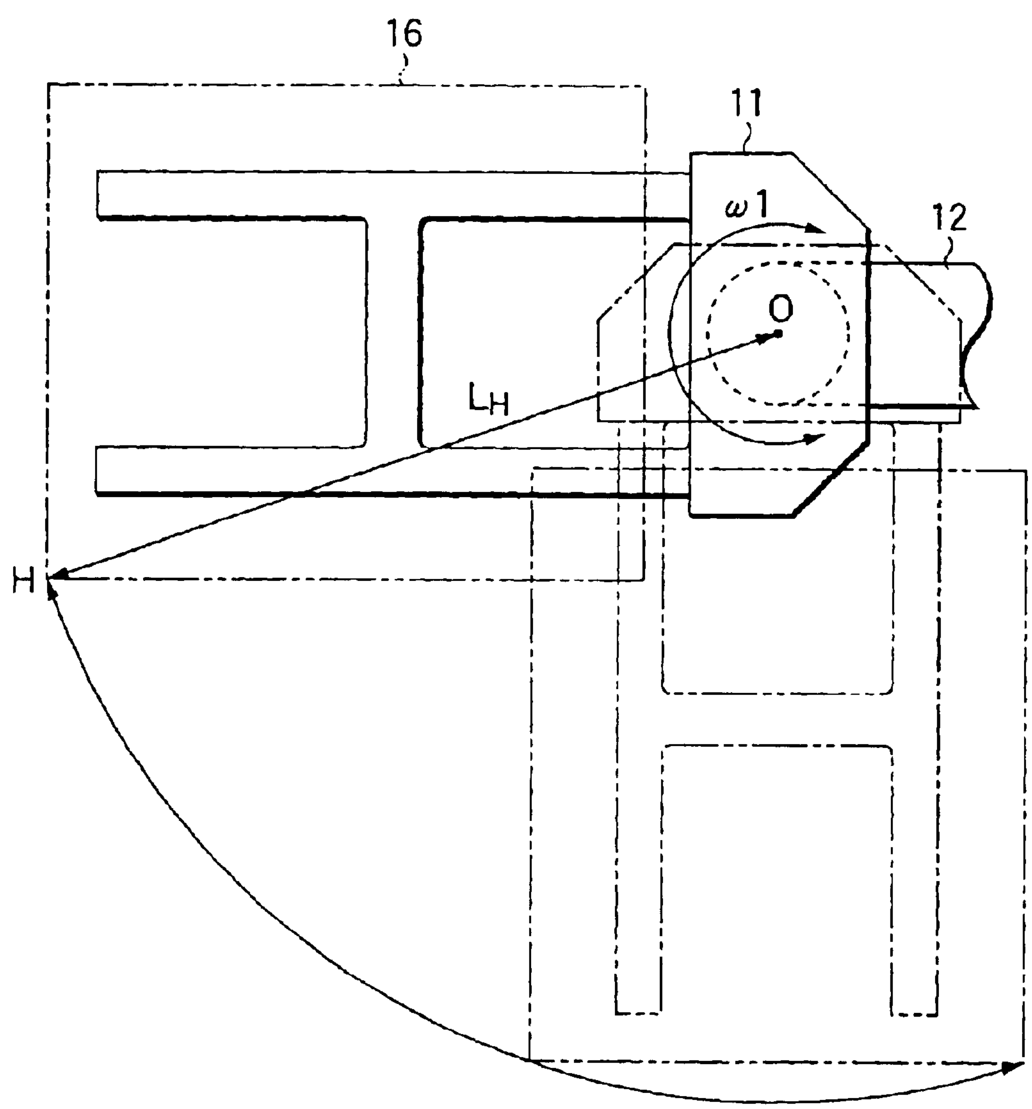
FIG. 4 is a plan view showing a robot hand part according to a second embodiment.

FIG. 4 is a plan view showing a hand part of a robot according to a second embodiment, for transferring a large glass substrate. In the drawing, numeral 11 is a fork-shaped hand provided in the top of a second arm 12 of a robot 1. The hand 11 is constructed so as to rotate about a rotation center point O of a wrist shaft provided in the second arm 12. Numeral 16 denotes a glass substrate which is a transferred article.

In a case of performing getting-out or storage of a pallet of the glass substrate 16 and transfer to a processing apparatus, when a command rotational speed $\omega_1$ of the wrist shaft specified by a program is commanded to rotate about the point O, depending on a value of the rotational speed $\omega_1$, a movement speed of the corner of the glass substrate 16 may exceed a movement command speed $V_S$ of a robot specified previously.

In such a case, a monitor point H is specified with respect to the wrist shaft which is a control point and, for example, a distance $L_H$ from the point O to the corner of the glass substrate is stored in a parameter storage part 21 and when there is an excessive rotational speed command $\omega_1$, the rotational speed command $\omega_1$ is changed and commanded in a manner similar to the first embodiment.

On the change, first, a speed $V_O$ of the corner is calculated by the following expression.

$$V_O=L_H\times\omega_1$$

The speed $V_O$ of the corner is compared with the movement command speed $V_S$ of a control point and a speed ratio $V_{ratio}$ is calculated.

$$V_{ratio}=V_S/V_O$$

Here, in a case of $V_{ratio}<1$, the rotational speed command $\omega_1$ is again changed based on the following expression and is commanded to a driving control part 25.

$$\omega_1=\omega_1\times V_{ratio}$$

By the above processing, a movement speed $V_H$ of the point H of the corner of the glass substrate 16 is changed and controlled within the command speed $V_S$ of the control point or the arm, etc.

Incidentally, in the above description, the case that the command rotational speed $\omega_1$ of the wrist shaft is specified has been shown, but when the command rotational speed $\omega_1$ of the wrist shaft is obtained from the movement command speed $V_S$ of the robot and monitor point information and is commanded to the driving control part 25, there is no need to previously specify the command rotational speed $\omega_1$ of the wrist shaft, so that input of a program or a parameter becomes unnecessary.

Third Embodiment

Figure 5:
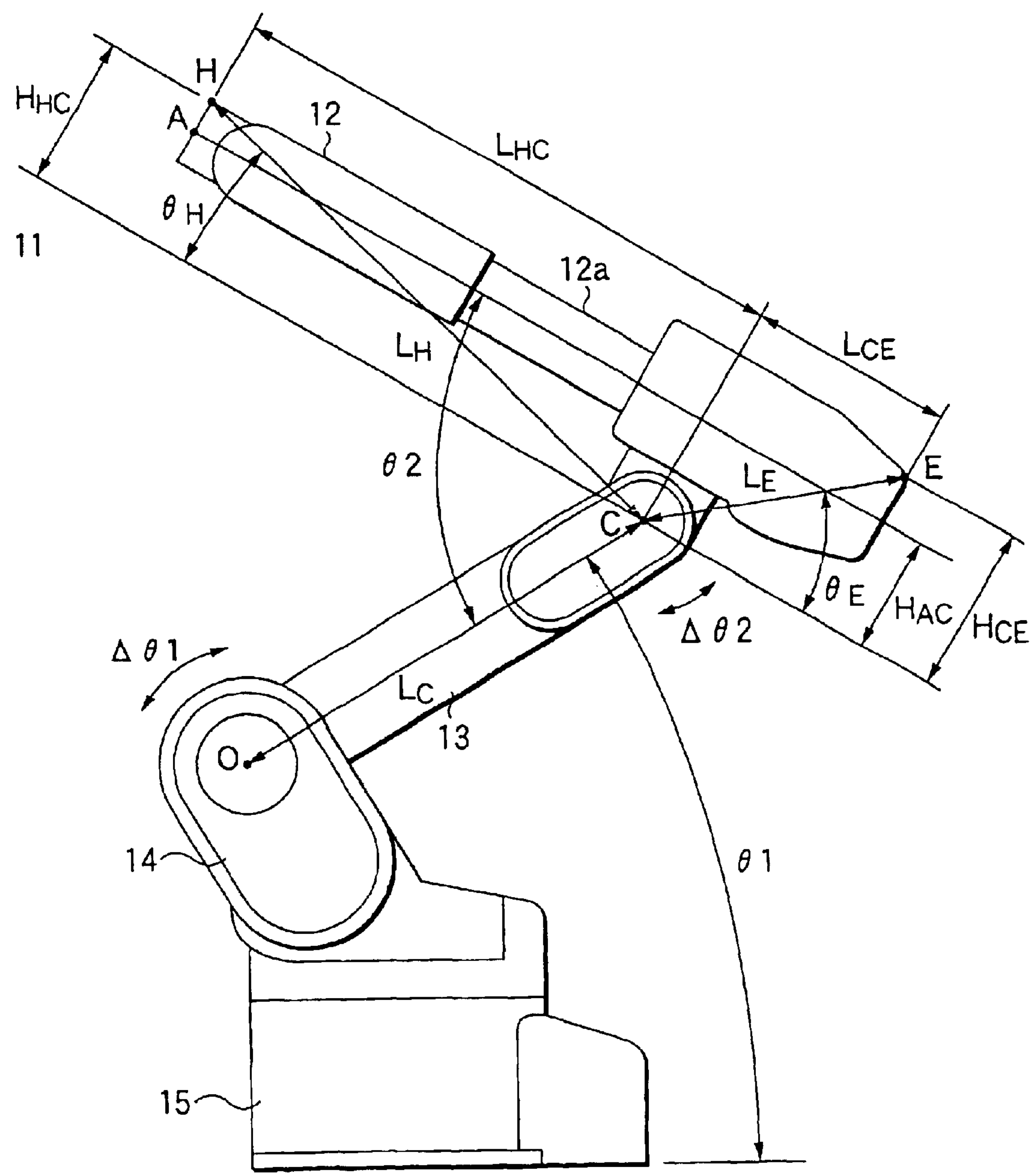
FIG. 5 is a motion illustration illustrating a motion of a robot according to a third embodiment.
Figure 6:
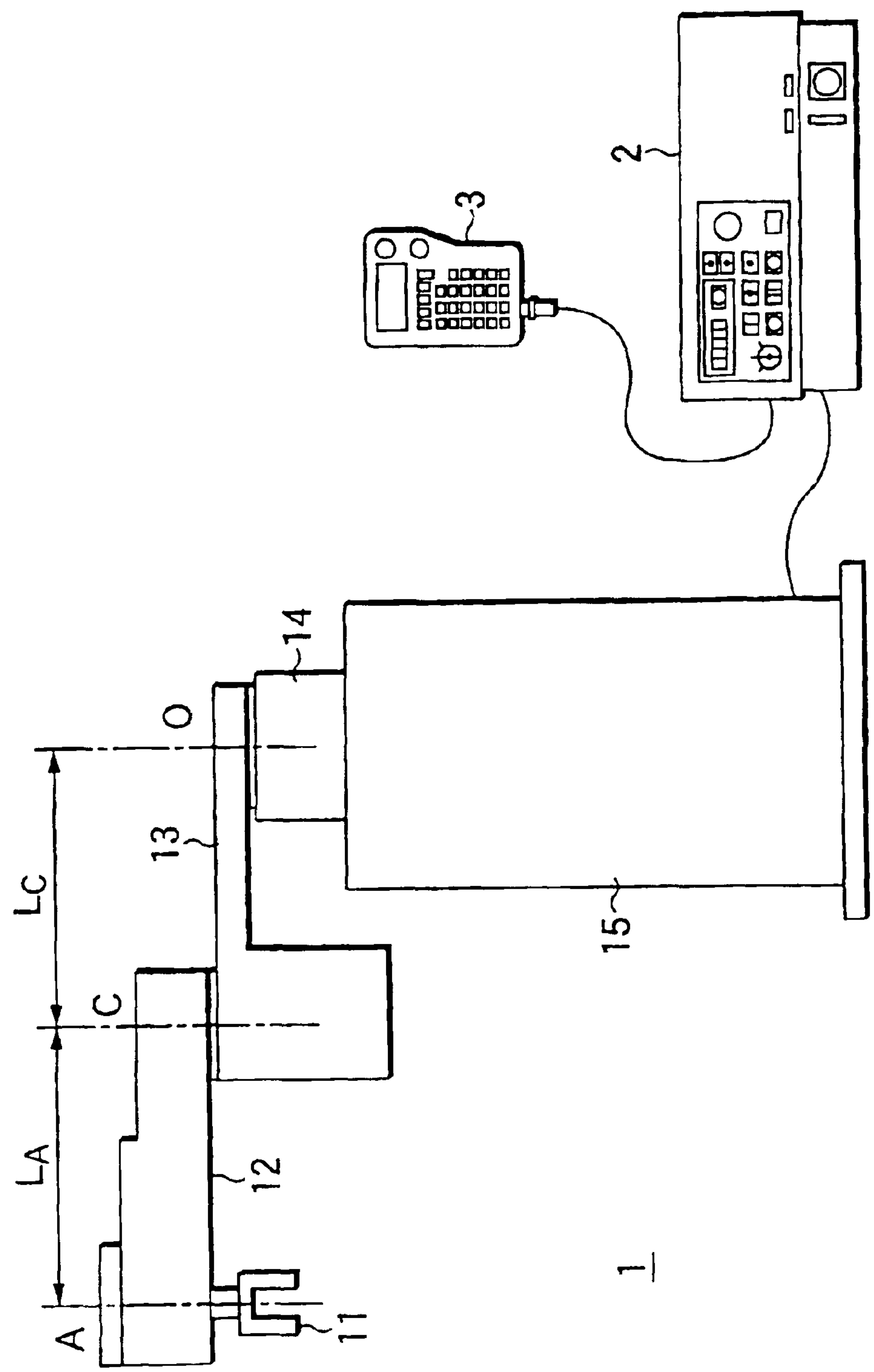
FIG. 6 is a configuration diagram showing an appearance of a general robot apparatus.
Figure 10:
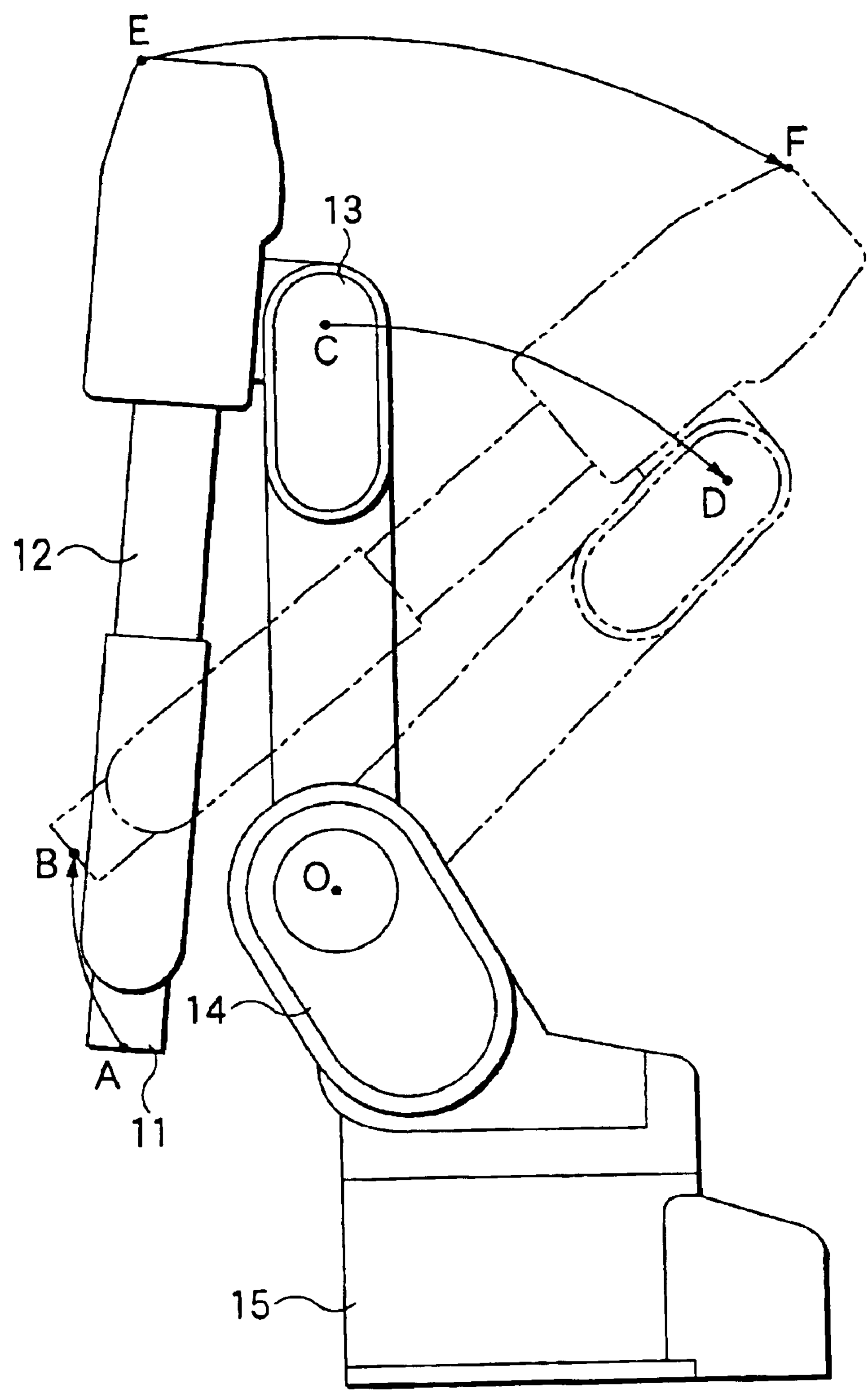
FIG. 10 is a motion illustration illustrating a motion of a vertical multi-joint type robot according to the related art.

FIG. 5 is a diagram showing a multi-joint type robot apparatus, for illustrating a third embodiment and is the same as the robot for illustrating problems of motions in the related art of FIG. 10. The third embodiment is constructed so that a distance to both ends of an arm and an angle viewed from a joint part are inputted as a monitor point and movement speed of each of control points, monitor points moving with motions of a joint are obtained, the movement speeds of the monitor points caused by the movement speeds of each control point are combined to obtain a combined movement speed, the maximum speed among the movement speeds of the control points, the movement speeds of the monitor points, and the combined movement speed of the monitor point is compared with a command speed, and the speed is limited when the maximum speed exceeds the command speed.

Incidentally, the control apparatus block diagram of FIG. 1 and the motion flowchart of FIG. 2 are the same, but the third embodiment differs from the first embodiment in the monitor point speed control part 27 and the processing contents in step 43.

The drawing will be described below.

In FIG. 5, numeral 11 is a hand of the top of a robot body 1, and numeral 12 is a second arm, and numeral 13 is a first arm, and numeral 14 is a support, and numeral 15 is a base. Also, a point A is a control point of the hand 11, and a point C is the rotation center of a joint between the first arm 13 and the second arm 12, and a point O is the rotation center of a joint between the support 14 and the first arm 13. $\theta_1$ is an angle which the first arm 13 forms with a horizontal plane and $\theta_2$ is an angle which the first arm 13 forms with the second arm 12.

A line segment $L_E$ is a distance from the point C of a joint part to a point E which is the longest position of the right side of the second arm 12 and $\theta_E$ is an angle of the point E viewed from the point C of the joint part and is indicated by an angle formed with a shaft 12*a* of the second arm 12. Also, a line segment $L_H$ is similarly a distance from the point C to a point H which is the longest position of the left side of the second arm and $\theta_H$ is an angle of the point H viewed from the point C of the joint part and is indicated by an angle formed with the shaft 12*a* of the second arm 12. These distances and angles are inputted from a key input part 31 as monitor point information and are stored in a parameter storage part 21. Incidentally, when a distance to the longest portion of a transferred article is inputted as $L_H$ while the transferred article being mounted in a portion of the hand 11, monitoring can be performed with respect to a speed of the top of the transferred article. Also, in place of the distances and angles which are the monitor point information, a distance $H_{CE}$ from the point C of the joint part shown in FIG. 5 to the point E and an axial distance $L_{CE}$ from the point C to the point E in a shaft direction of the second arm 12 may be inputted as the monitor point information. Similarly, with regard to the point H of the other end of the second arm 12, a distance $L_{HC}$ and a distance $H_{HC}$ may be inputted.

Next, motions in a case where a movement command is issued from a program with respect to a control point of the point A and as a result of that, both rotation movements of the first arm 13 and the second arm 12 are generated will be described.

When a movement command of the hand 11 from a program is issued in a locus generation part 22, a control apparatus 2 determines the movement amount $\Delta L$ of the hand 11 in a calculation cycle $\Delta T$ from a command speed $V_S$ (step 41). A control point speed control part 26 determines a movement command at each control point such as a rotational angle $\Delta\theta_1$ of the point O of a joint part which is a motion angle of the first arm 13 and a rotational angle $\Delta\theta_2$ of the point C which is a motion angle of the second arm 12, etc. based on the movement amount $\Delta L$ (step 42).

Then, in a monitor point speed control part 27, a movement speed of each monitor point is obtained based on the movement command of the rotational angle of each joint determined in step 42 (step 43).

For example, a speed $V_{EO}$ of a monitor point E associated with rotation of the point O of a joint part is obtained by the following expression.

$$V_{EO}=L_{OE}\times\Delta\theta_1/\Delta T$$

where a distance $L_{OE}$ is a distance between the point O and the point E. The distance $L_{OE}$ can be obtained from a distance $L_C$ between the joints of the first arm 13, an attitude angle $\theta_1$ of the first arm 13, an attitude angle $\theta_2$ of the second arm 12, an angle $\theta_E$ of the monitor point E and a distance $L_E$ to the monitor point E.

Then, a speed $V_{EC}$ of the monitor point E associated with rotation of the point C of a joint part is obtained by the following expression.

$$V_{EC}=L_E\times\Delta\theta_2/\Delta T$$

Here, the speeds $V_{EO}$, $V_{EC}$ generated with the movement of each joint can be combined to obtain a speed $V_E$ of the monitor point E.

Similarly, a speed $V_{HO}$ of a monitor point H associated with rotation of the point O of a joint part is obtained by the following expression.

$$V_{HO}=L_{OH}\times\Delta\theta_1/\Delta T$$

where a distance $L_{OH}$ is a distance between the point O and the point H. The distance $L_{OH}$ can be obtained from the distance $L_C$ between the joints of the first arm 13, the attitude angle $\theta_1$ of the first arm 13, the attitude angle $\theta_2$ of the second arm 12, an angle $\theta_H$ of the monitor point H and a distance $L_H$ to the monitor point H.

Then, a speed $V_{HC}$ of the monitor point H associated with rotation of the point C of a joint part is obtained by the following expression.

$$V_{HC}=L_H\times\Delta\theta_1/\Delta T$$

Here, vectors having the speeds $V_{HO}$, $V_{HC}$ generated with the movement of each joint and directions are combined, whereby a combined speed $V_H$ of the monitor point E can be obtained.

In addition, all the movement speeds of the specified monitor points are calculated and the speeds are compared in combination with the movement speeds of all the control points obtained by the control point speed control part 26. In a motion command part 28, when there is a control point or a monitor point having the maximum speed exceeding the command speed $V_S$, a motion position is changed so that the maximum speed becomes the command speed $V_S$ and as a result of that, the movement speed is changed.

Industrial Applicability

As described above, a robot control apparatus according to this invention can change and control a movement speed of each region of a robot to a command speed or lower, so that it is suitable for safe teaching work of the robot.

What is claimed is:

1. A robot control apparatus comprising:

an input section for inputting and specifying a speed command value of a robot and position information of a monitor point;

a parameter storage section for storing the speed command value of the robot and the position information of the monitor point;

a locus generation part for generating a movement command for driving each joint part based on a movement command of the robot;

a control point speed control part for obtaining movement speed of each joint part as a control point based on the movement command from the locus generation part;

a monitor point speed control part for obtaining motion speed of the monitor point based on the motion speed of each control point from the control point speed control part and the position information of the monitor point stored in the parameter storage section;

a motion command part for selecting the maximum motion speed among motion speed of each control point and the motion speed of the monitor point as the maximum motion speed to compare the maximum motion speed with the speed command value and changing and outputting the movement command so that the motion speed of the control point or the monitor point of the maximum motion speed becomes the speed command value or lower when the maximum motion speed exceeds the speed command value; and a driving control part for driving the robot based on the motion speed outputted from the motion command part.

2. The robot control apparatus according to claim 1, wherein the maximum distance to bidirectional arm ends when viewed from the joint part and an angle are specified as the information of the monitor point.

3. The robot control apparatus according to claim 1, wherein a region of a transferred article is specified as the information of the monitor point.

4. A robot control apparatus comprising:

an input section for inputting and specifying a speed command value of a robot and position information of a monitor point;

a parameter storage section for storing the speed command value of the robot and the position information of the monitor point;

a locus generation part for generating a movement command for driving each joint part based on a movement command of the robot;

a control point speed control part for obtaining movement speed of each joint part as a control point based on the movement command from the locus generation part;

a monitor point speed control part for obtaining motion speed of each monitor point accompanied with movement speed of each control point based on the motion speed of each control point obtained from the control point speed control part and the position information of the monitor point stored in the parameter storage section and further generating movement speed of the monitor point accompanied with motions of the plurality of joints by combining the movement speed of each monitor point to obtain combined motion speed;

a motion command part for selecting the maximum motion speed among motion speed of each control point and the motion speed of the monitor point as the maximum motion speed to compare the maximum motion speed with the speed command value and changing and outputting the movement command so that the motion speed of the control point or the monitor point of the maximum motion speed becomes the speed command value or lower when the maximum motion speed exceeds the speed command value; and a driving control part for driving the robot based on the motion speed outputted from the motion command part.

5. The robot control apparatus according to claim 4, wherein the maximum distance to bidirectional arm ends when viewed from the joint part and an angle are specified as the information of the monitor point.

6. The robot control apparatus according to claim 4, wherein a region of a transferred article is specified as the information of the monitor point.

7. A robot control apparatus having a rotary shaft, comprising:

an input section for inputting and specifying a speed command value of a robot, a rotational speed command value of the rotary shaft of the robot, and position information of a monitor point;

a parameter storage section for storing the speed command value of the robot, the rotational speed command value of the rotary shaft, and the position information of the monitor point;

a locus generation part for generating a command for rotating and driving the rotary shaft based on the rotational movement command value of the rotary shaft of the robot;

a control point speed control part for obtaining rotational speed of the rotary shaft based on the rotational movement command from the locus generation part;

a monitor point speed control part for obtaining movement speed of the monitor point based on the rotational speed of the rotary shaft from the control point speed control part and the information of the monitor point stored in the parameter storage m section;

a motion command part for changing and outputting the rotational movement command so that the movement speed of the monitor point becomes the speed command value or lower when the movement speed of the monitor point exceeds the speed command value; and a driving control part for driving the rotary shaft of the robot based on a motion speed outputted from the motion command part.

* * * * *